(No Model.)
A. L. SILVERNAIL.
GEOGRAPHICAL GLOBE.
No. 452,291. Patented May 12, 1891.
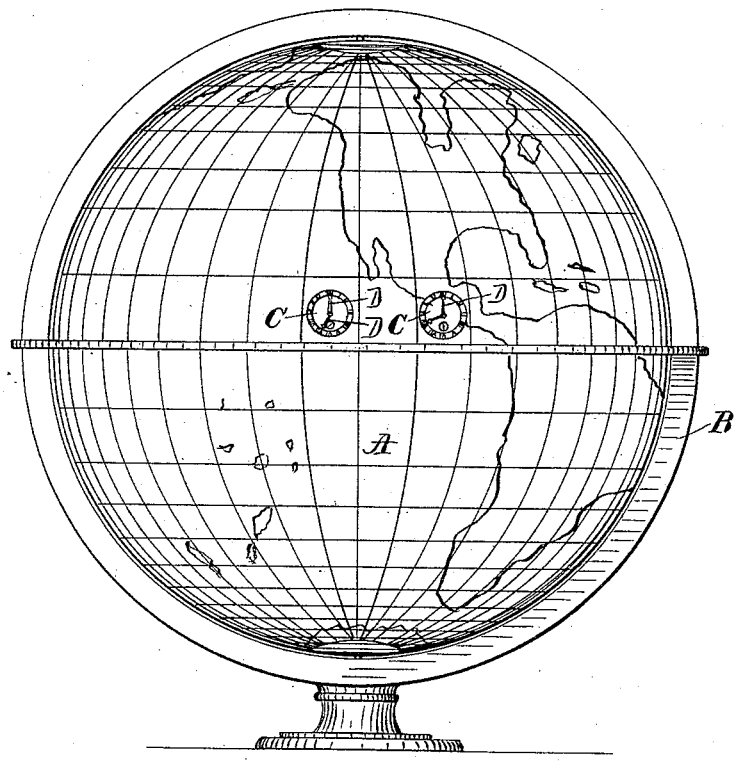
WITNESSES:
INVENTOR
BY
ATTORNEY.S

UNITED STATES PATENT OFFICE.

ALPHEUS L. SILVERNAIL, OF IONIA, MICHIGAN.

GEOGRAPHICAL GLOBE.

SPECIFICATION forming part of Letters Patent No. 452,291, dated May 12, 1891.

Application filed April 3, 1890. Serial No. 346,472. (No model.)

*To all whom it may concern:*

Be it known that I, ALPHEUS L. SILVERNAIL, a citizen of the United States, residing at Ionia, in the county of Ionia and State of Michigan, have invented certain new and useful Improvements in Geographical Globes; and I do hereby declare the following to be a full, clear, and exact description of the invention, such as will enable others skilled in the art to which it appertains to make and use the same.

This invention has relation to educational appliances, and its object is the construction of a device which will indicate the local time at any corresponding longitudinal place upon the earth's surface either at a particular time or times of day or at any time covering the entire twenty-four hours.

To this end the invention consists of a geographical globe having secured thereon one or more clock-dials provided with movable fingers or pointers.

The invention is illustrated in the accompanying figure of drawing, in which—

A represents a suitable globe, provided, as usual, with longitudinal and equatorial lines. This globe A is pivoted and adapted to revolve in a frame B, and on its surface is secured at suitable point or points a clock dial or dials C, which are each provided with movable pointers or fingers D. These fingers or pointers may be moved or adjusted in any convenient manner, as by the hands of the teacher or user, or by any mechanical means, such— for example, as the ordinary clock-works.

The adjustability of the fingers is a feature of great importance in my invention, enabling, as it does, the teacher to more quickly and thoroughly teach the scholars the method of computing the difference in time between two or more places when the meridian of the places are given them, and also to more quickly and thoroughly teach the scholars to find the difference in latitude from the difference in time than is possible with the map heretofore proposed for adoption for this purpose, said map having illustrated on it a series of dials and hands opposite to which are placed the names of the places they represent, as is obvious.

Having now described my invention, what I believe to be new, and desire to secure by Letters Patent, is—

1. As an improved article of manufacture, a mechanical educational appliance for indicating the difference of time between two or more places, comprising a geographical globe, two or more clock-dials secured thereto at the places the local times of which they are desired to indicate, and movable fingers on said clock-dials.

2. As an improved article of manufacture, a mechanical educational appliance for indicating the difference of time between two or more places, comprising a geographical globe pivoted to revolve in a suitable frame and provided with longitudinal and equatorial lines, two or more clock-dials secured to the exterior surface of said globe at points corresponding to the meridians of the places the local times of which they are desired to indicate, and movable fingers on said clock-dials.

In testimony whereof I affix my signature in presence of two witnesses.

ALPHEUS L. SILVERNAIL.

Witnesses:
GUY W. RATHBUN,
WILLIAM H. PHILLIPS.